United States Patent
Umeda et al.

[19]

[11] Patent Number: 6,097,130

[45] Date of Patent: Aug. 1, 2000

[54] ALTERNATOR FOR VEHICLE

[75] Inventors: Atsushi Umeda, Okazaki; Tsutomu Shiga, Aichi-ken; Shin Kusase, Oobu, all of Japan

[73] Assignee: Denso Corporation, Kariya, Japan

[21] Appl. No.: 09/083,944

[22] Filed: May 26, 1998

[30] Foreign Application Priority Data

| May 26, 1997 | [WO] | WIPO | ................... PCT/WO97/1778 |
| Sep. 22, 1997 | [WO] | WIPO | ................... PCT/WO97/3374 |
| Sep. 26, 1997 | [JP] | Japan | ................... 9-262229 |

[51] Int. Cl.$^7$ .................................................. H02K 1/22
[52] U.S. Cl. ........................................... 310/263; 310/261
[58] Field of Search .................................... 310/154, 179, 310/180, 261, 263

[56] References Cited

U.S. PATENT DOCUMENTS

| 4,201,930 | 5/1980 | Inagaki et al. ............................. 310/51 |
| 5,233,255 | 8/1993 | Kusumoo et al. ....................... 310/263 |

FOREIGN PATENT DOCUMENTS

| 0762617 | 3/1997 | European Pat. Off. . |
| 61-85045 | 4/1986 | Japan . |
| 5-11769 | 2/1993 | Japan . |

OTHER PUBLICATIONS

Yoshikazu, "Pawl Shape of Rotor Core Structure for Automotive Generator", Patent Abstracts of Japan, Dec. 13, 1988.

Takashi, "Rotary Electric Machine", Patent Abstracts of Japan, Aug. 24, 1985.

Susumu, "AC Power Generator for Vehicle", Patent Abstracts of Japan, Aug. 12, 1994.

*Primary Examiner*—Nestor Ramirez
*Assistant Examiner*—Judson H. Jones
*Attorney, Agent, or Firm*—Pillsbury Madison & Sutro LLP

[57] ABSTRACT

It is an object of this invention to provide a compact high-power alternator for a vehicle which is good in cooling performance, efficiency, and cost without decreasing a coil resistance or using a magnet. The alternator for the vehicle includes a stator and a rotor. The rotor includes a Lundel-type iron core and a field coil provided on the Lundel-type iron core. The Lundel-type iron core has a cylindrical portion (71), a yoke portion (72), and a claw-like magnetic pole portion (73). The field coil is provided on the cylindrical portion (71). The yoke portion (72) extends from the cylindrical portion (71) in a radially outward direction. The claw-like magnetic pole portion (72) is connected to the yoke portion (72), and is formed so as to surround the field coil. The stator includes a multiple-layer iron core (32). A ratio of an axial-direction length L1 of the multiple-layer iron core (32) to an axial-direction length L2 of the cylindrical portion (71) of the Lundel-type iron core is in a range of 1.25 to 1.75. A ratio of an outside diameter R2 of the cylindrical portion (71) of the Lundel-type iron core to an outside diameter R1 of the claw-like magnetic pole portion (73) of the Lundel-type iron core is in a range of 0.54 to 0.60.

6 Claims, 10 Drawing Sheets

$S1 \risingdotseq S2 \risingdotseq S3$
$L1 \risingdotseq L2$

FIG. 3
PRIOR ART

$S1 \risingdotseq S2 \risingdotseq S3$
$L1 > L2$

FIG. 4
PRIOR ART

$S1 \fallingdotseq S2 > S3$
$L1 \fallingdotseq L2$

FIG. 5

$S1 \fallingdotseq S2 > S3$
$L1 > L2$

ALTERNATOR FOR VEHICLE

BACKGROUND OF THE INVENTION

1. Field of the Invention

This invention relates to an alternator for a vehicle such as a passenger automotive vehicle or a truck.

2. Description of the Related Art

To reduce the aerodynamic resistance in a traveling condition, a vehicle body tends to be formed into a slant nose shape. Securing a sufficient residential space for a passenger compartment is earnestly demanded. To satisfy these requirements, engine rooms of automotive vehicles have recently been becoming so narrow and crowded that only a limited space is available for installing an alternator. In addition, the temperature of a region around the alternator has been high. Meanwhile, to improve fuel economy, the rotational engine speed tends to be reduced during an idling condition. The rotational speed of the alternator decreases in accordance with the reduction of the rotational engine speed. On the other hand, there is a need for increasing electric loads on safety control devices or others. Thus, the power generating ability of the alternator is strongly required. In other words, a compact high-power alternator for a vehicle is required. Also, an inexpensive alternator for a vehicle is desired.

Figure 2:
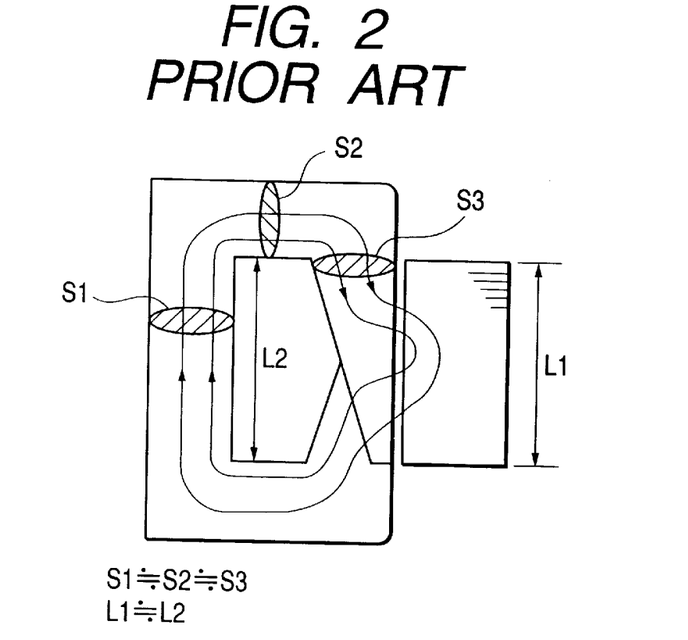
FIG. 2 is a diagram of magnetic flux flowing in a rotor and a stator in a prior-art structure in which the cross-sectional areas of magnetic paths in respective portions of a pole core are set substantially or approximately equal.

In a general alternator (a prior-art alternator) for a vehicle, as shown in FIG. 2, a rotor contains a Lundel-type iron core (referred to as the pole core hereinafter) having a cylindrical portion, a yoke portion, and a claw-like magnetic pole portion. The entire length of the general alternator is determined by the axial-direction length (referred to as the axial length hereinafter) of the rotor. Accordingly, a reduction in the axial length of the rotor is desired for a compact alternator design.

In the rotor of the general alternator, as shown in FIG. 2, magnetic flux Φ flows from the cylindrical portion to the yoke portion and the claw-like magnetic pole portion, gradually advancing from the claw-like magnetic pole portion to a stator iron core. The magnetic flux Φ generated from the rotor is given as follows.

$$\Phi = AT/G$$

where "A" denotes a current flowing in a field coil; "T" denotes the number of turns of the field coil; and "G" denotes the sum of the magnetic resistances of respective portions. The term "AT" indicates the product of the current "A" and the turn number "T" which is proportional to the square root of the cross-sectional area of the field coil. The product "AT" is also referred to as the coil "AT". Each of the magnetic resistance is proportional to the length of a magnetic path which is divided by the cross-sectional area of the magnetic path.

In the prior-art structure of FIG. 2, the magnetic-path cross-sectional areas S1, S2, and S3 at different portions of the pole core are set substantially equal to each other to prevent the occurrence of local magnetic saturation. The dimensions of the portions of the pole core are chosen to provide a proper space for the field coil. The cross-sectional area of a magnetic path in the stator iron core is made substantially uniform in correspondence with the magnetic flux generated by the rotor. The cross-sectional area of each slot in the stator iron core is decided on the basis of the resistance of a winding. As a result, the axial length of the stator is also decided.

In a prior-art magnetic circuit which is designed in such a way, the axial length L2 of the cylindrical portion of the pole core is substantially or approximately equal to the axial length L1 of the stator iron core as shown in FIG. 2.

In the prior-art structure of FIG. 2, when an increased alternator power output is required, the magnetic flux generated by the rotor is increased. To implement the generation of an increased magnetic flux, it is necessary to increase the coil "AT" (that is, enlarge the field coil) or to reduce the magnetic resistance.

In the prior-art structure of FIG. 2, if the generated magnetic flux is increased without changing the size of the rotor, the cross-sectional areas of the respective portions of the rotor need to be reduced to allow an increase in the cross-sectional area of the field coil to enhance the coil "AT". If a greater cross-sectional area of the magnetic path is required to reduce the magnetic resistance, it is necessary to reduce the cross-sectional area of the field coil. Thus, the prior-art structure of FIG. 2 needs to consider a trade-off between the two requirements.

Figure 3:
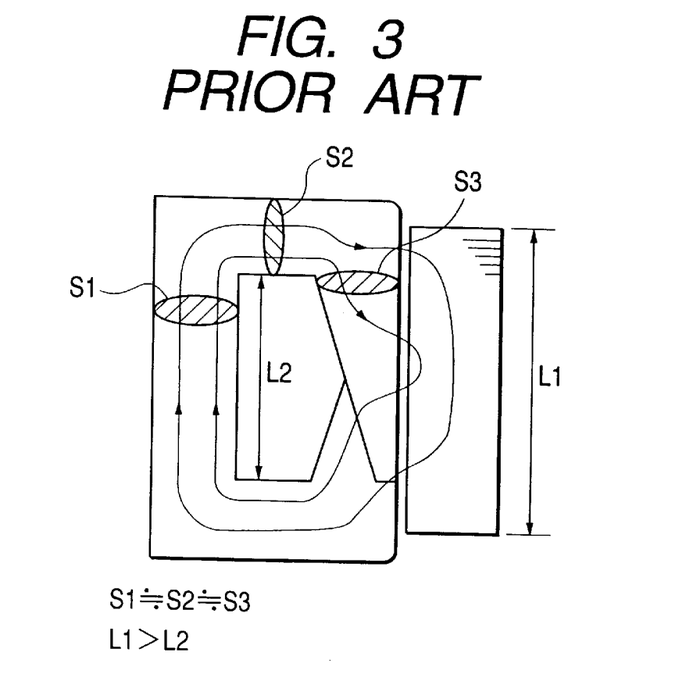
FIG. 3 is a diagram of magnetic flux flowing in a rotor and a stator in a prior-art structure in which the axial length of a stator iron core is set greater than the axial length of a cylindrical portion of a pole core.

FIG. 3 shows another prior-art structure in which the dimensions of a rotor are equal to those of the rotor in the prior-art structure of FIG. 2 and the axial length L1 of a stator iron core is set longer than the axial length L2 of a cylindrical portion of a pole core to reduce the magnetic resistance of the stator iron core and the air gap between the rotor and the stator. If the magnetic resistance of the stator side is reduced to increase magnetic flux, only a small increase in the magnetic flux is available since the amount of the magnetic flux is limited by magnetic saturations in the respective portions of the rotor. In this case, there hardly occurs an improvement of an alternator power output per unit weight since an increase in the weight of the stator serves as a cancelling factor.

Figure 4:
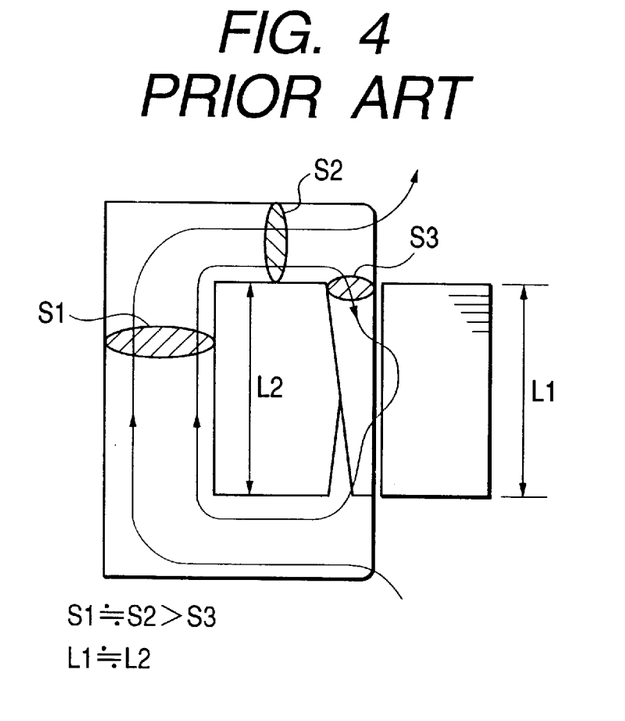
FIG. 4 is a diagram of magnetic flux flowing in a rotor and a stator in a prior-art structure in which the cross-sectional area of a base of a claw-like magnetic pole portion of a pole core is set narrower than the cross-sectional areas of a cylindrical portion and a yoke portion thereof, and the cross-sectional area of a coil is set large.

FIG. 4 shows still another prior-art structure in which the cross-sectional area S3 of a base of a claw-like magnetic pole portion is set smaller than the cross-sectional area S1 of a cylindrical portion and the cross-sectional area S2 of a yoke portion to allow a great cross-sectional area of a field coil. In the prior-art structure of FIG. 4, the base of the claw-like magnetic pole portion tends to magnetically saturate. Therefore, although the cylindrical portion and the yoke portion have sufficient magnetic capacities, the magnetic resistance of the base of the claw-like magnetic pole portion tends to abruptly rise so that the amount of magnetic flux is significantly limited.

In the prior-art structure of FIG. 4, the magnetic flux is blocked by the claw-like magnetic pole portion so that the magnetic flux leaks along an axial direction. The leak of the magnetic flux results in a reduction of magnetic flux reaching a stator iron core. The reduced magnetic flux in the stator iron core decreases an alternator power output.

In a known field coil occupying a narrower space, the resistance of the coil is reduced and a field current is increased to provide a proper coil "AT". In this case, the rate of heat generated by the field coil increases so that a problem occurs in the cooling thereof. Also, there occur the problems that the excitation loss rises and the power generation efficiency drops.

Japanese published unexamined patent application 61-85045 discloses that a magnet is inserted into a region between claw-like magnetic pole portions to prevent a leak of magnetic flux and thereby to increase the amount of magnetic flux in a rotor. In this case, a cost problem occurs due to the magnet. In addition, it is necessary to provide a device for retaining the magnet. The retaining device increases the cost. Furthermore, there is a chance that the magnet moves out of the normal position due to a centrifugal force. Therefore, it is difficult to practically use the prior-art structure of Japanese application 61-85045.

SUMMARY OF THE INVENTION

The inventors have found the following fact. The above-mentioned problems are caused by a designing policy in which magnetic flux flowing in a magnetic path in a pole core is regarded as being always uniform, and cross-sectional areas of different portions of the magnetic path are assumed to be equal.

In the prior-art structures of FIGS. 2 and 4, the axial lengths L1 and L2 are equal to each other, and magnetic flux tends to uniformly flow. Thus, the prior-art structures of FIGS. 2 and 4 need to be designed under equal cross-sectional areas of a magnetic path. Accordingly, it is necessary that the cross-sectional area of a rotor is substantially uniform. In the prior-art structures of FIGS. 2 and 4, as the cross-sectional area of the magnetic path is increased, the cross-sectional area of a field coil needs to be reduced. Thus, the ability of the field coil decreases.

In the prior-art structure of FIG. 3, the axial length L1 is greater than the axial length L2, and the yoke portion opposes the stator iron core. Thus, in this case, magnetic flux directly flows from the yoke portion to the stator. Accordingly, the amount of magnetic flux in the claw-like magnetic pole portion decreases, and hence a narrower cross-sectional area of the base of the claw-like magnetic pole portion may suffice.

Figure 5:
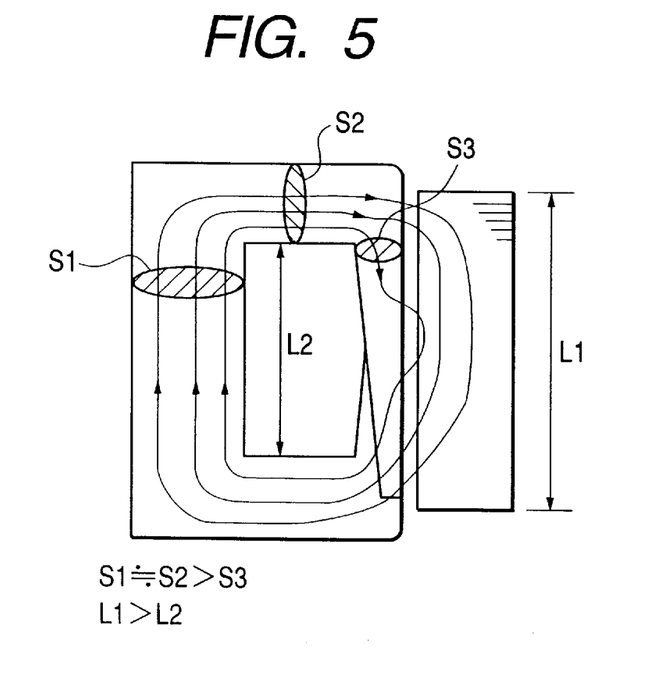
FIG. 5 is a diagram of magnetic flux flowing in a rotor and a stator in a structure of this invention in which the cross-sectional area of a base of a claw-like magnetic pole portion of a pole core is set narrower than the cross-sectional areas of a cylindrical portion and a yoke portion thereof, and the axial length of a stator iron core is set greater than the axial length of a cylindrical portion of a pole core.

The inventors have created a new structure of FIG. 5, and have discovered the advantages provided by the new structure of FIG. 5. In the new structure of FIG. 5, the cross-sectional areas S1 and S2 of a cylindrical portion and a yoke portion are set great while the cross-sectional area S3 of the base of a claw-like magnetic pole portion is set small. In this case, a part of magnetic flux increased according to the greater cross-sectional areas S1 and S2 can flow directly from the yoke portion to a stator while the remaining part thereof can pass through the claw-like magnetic pole portion before flowing into the stator. As a result, the cross-sectional area of the magnetic path can be increased and hence the amount of magnetic flux can be increased while a desired cross-sectional area of a field coil can be maintained.

In the new structure of FIG. 5, the yoke portion opposes the stator iron core. This design means that the amount of magnetic flux leaking from the yoke portion to an exterior is minimized. Thus, it is possible to increase the efficiency of use of the magnetic flux generated by the rotor.

Figure 6:
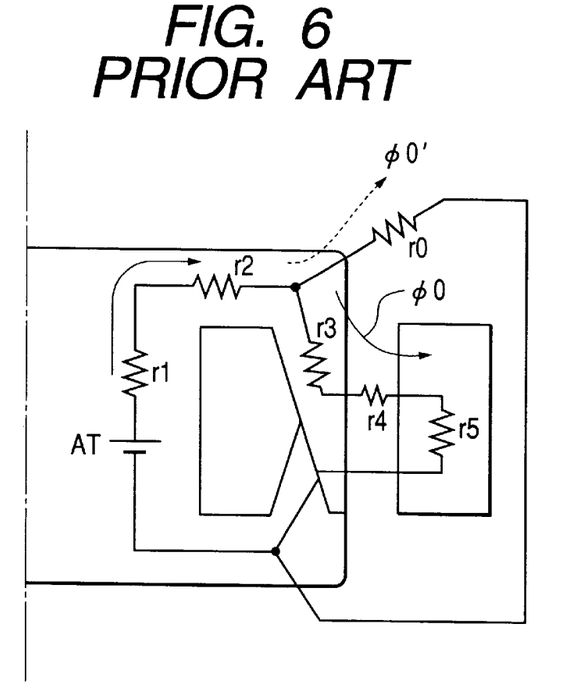
FIG. 6 is a diagram of an equivalent magnetic circuit of a prior-art structure.
Figure 7:
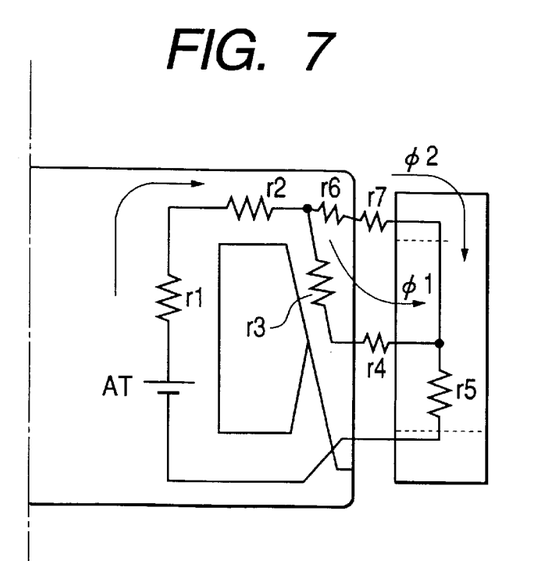
FIG. 7 is a diagram of an equivalent magnetic circuit of a structure according to this invention.

FIG. 6 shows an equivalent magnetic circuit of the prior-art structures of FIGS. 2 and 4. FIG. 7 shows an equivalent magnetic circuit of the new structure of FIG. 5. According to FIG. 7, magnetic resistors r6 and r7 are added on a parallel basis to the equivalent magnetic circuit in FIG. 6. A magnetic resistor r0 corresponding to a magnetic leak from the yoke portion to an exterior is subrogated by the magnetic resistor r7. Thus, regarding the equivalent magnetic circuit in FIG. 7, it is thought that magnetic flux $\Phi 0'$ which leaks to the exterior is substantially absent.

In the equivalent magnetic circuit of FIG. 6, magnetic flux $\Phi 0$ uniformly flows in the pole core when the claw-like magnetic pole portion remains magnetically unsaturated. In the equivalent magnetic circuit of FIG. 7, magnetic flux $\Phi 0$ separates into magnetic flux $\Phi 1$ flowing in the claw-like magnetic pole portion and magnetic flux $\Phi 2$ directly flowing into the stator iron core. The magnetic flux $\Phi 1$ which flows in the claw-like magnetic pole portion is smaller than the magnetic flux $\Phi 0$ as indicated in the following ratio equation.

$$\Phi 1 = \{(r6+r7)\Phi 0\}/(r3+r4+r6+r7)$$

Accordingly, in the case where the cross-sectional area of the magnetic path in the claw-like magnetic pole portion is reduced at this ratio, magnetic saturation remains absent and the amount of whole magnetic flux $\Phi 0$ does not decrease.

In the equivalent magnetic circuit of FIG. 6, when magnetic saturation occurs so that the resistance of the magnetic resistor r3 becomes great, magnetic flux leaks from the yoke portion to an exterior via the magnetic resistor r0. On the other hand, in the equivalent magnetic circuit of FIG. 7, even when saturation occurs so that the resistance of the magnetic resistor r3 becomes great, magnetic flux is enabled to flow into the stator iron core via the magnetic resistor r7. Thus, according to the equivalent magnetic circuit of FIG. 7, it is possible to miniaturize the claw-like magnetic pole portion.

A reduction in the cross-sectional area of the claw-like magnetic pole portion increases the usable space in the pole core. When the increase in the usable space is optimally distributed to an increase in the cross-sectional area of the magnetic path and an increase in the area of the field coil, the alternator power output can be remarkably improved over that available in a prior-art structure.

In the equivalent magnetic circuit of FIG. 7, the resistances of the magnetic resistors r6 and r7 which are added on a parallel basis depend on the difference between the axial length L1 of the stator iron core and the axial length L2 of the cylindrical portion. Thus, as this difference increases, the cross-sectional area of the claw-like magnetic pole portion can be reduced so that the alternator power output can be further improved. On the other hand, the weight of the stator increases in proportion to the axial length L1 of the stator iron core. Therefore, the alternator power output per unit weight is maximized under certain conditions.

This invention has been carried out in view of the above-mentioned idea. This invention uses a design in which the axial length L1 of a stator iron core is made greater than the axial length L2 of a cylindrical portion. Also, this invention uses a design in which the dimensions of portions are suitably determined. These designs provide a synergistic effect. This invention uses the synergistic effect, and has an object to provide a compact high-power alternator for a vehicle which is good in cooling performance, efficiency, and cost without decreasing a coil resistance or using a magnet.

According to the invention of claim 1, an alternator for a vehicle includes a field rotor and a stator. The field rotor includes a Lundel-type iron core and a field coil provided on the Lundel-type iron core. The Lundel-type iron core has a cylindrical portion, a yoke portion, and a claw-like magnetic pole portion. The field coil is provided on the cylindrical portion. The yoke portion extends from the cylindrical portion in a radially outward direction. The claw-like magnetic pole portion is connected to the yoke portion. The claw-like magnetic pole portion is formed so as to surround the field coil. The stator is located radially outward of the claw-like magnetic pole portion of the rotor. The stator opposes the claw-like magnetic pole portion of the rotor. The stator includes a multiple-layer iron core and an armature coil provided on the multiple-layer iron core. A ratio of an axial length L1 of the multiple-layer iron core of the stator to an axial length L2 of the cylindrical portion of the Lundel-type iron core, that is, the value "L1/L2", is in a range of 1.25 to 1.75. A ratio of an outside diameter R2 of the cylindrical portion of the Lundel-type iron core to an outside diameter R1 of the claw-like magnetic pole portion of the Lundel-type iron core, that is, the value "R2/R1", is in a range of 0.54 to 0.60.

In the invention of claim 1, the ratio of the axial length L1 of the multiple-layer iron core of the stator to the axial length L2 of the cylindrical portion of the Lundel-type iron core, that is, the value "L1/L2", is in the range of 1.25 to 1.75. Therefore, as shown in FIG. 3, the yoke portion of a pole core can be made to oppose the stator iron core, and magnetic flux can directly flow from the yoke portion into the stator iron core. Thus, the magnetic flux which comes from the claw-like magnetic pole portion can be reduced, and the cross-sectional area of the claw-like magnetic pole portion can be reduced in proportion thereto. Accordingly, a usable space in the pole core is provided with a surplus so that the ratio of the outside diameter R2 of the cylindrical portion of the Lundel-type iron core to the outside diameter R1 of the claw-like magnetic pole portion of the Lundel-type iron core, that is, the value "R2/R1", can be properly set with a magnetic-path cross-sectional area being greater than that in a prior-art structure while a suitable coil cross-sectional area is provided. Specifically, the value "R2/R1" is set in the range of 0.54 to 0.60. Thereby, it is possible to provide a compact, highly efficient, and high-power alternator without increasing a field current.

In the invention of claim 2, a ratio of a radial-direction thickness X1 of a base of the claw-like magnetic pole portion to an axial-direction thickness X2 of the yoke portion, that is, the value "X1/X2", is in a range of 0.5 to 0.9. Since the ratio "X1/X2" is set in the previously-indicated range, the magnetic flux density in the claw-like magnetic pole portion can be set to a suitable value without any overs and shorts. Accordingly, it is possible to prevent the radial-direction thickness X1 of the base of the claw-like magnetic pole portion from being so large as to deteriorate the coil cross-sectional area. Also, it is possible to prevent the radial-direction thickness X1 of the base of the claw-like magnetic pole portion from being so small as to reduce the alternator power output.

In the invention of claim 3, an axial-direction cross section of the field coil is substantially symmetrical with respect to an axial-direction center, and has a mountain-like shape such that an outside diameter of a part of the field coil is greater as the part of the field coil is closer to a center position. Thereby, a coil occupancy can be improved, and the alternator power output can be further increased.

In the invention of claim 4, a resin impregnated sheet surrounds the field coil, and the field coil is in engagement with an inner circumferential surface of the claw-like magnetic pole portion via the resin impregnated sheet. Since the field coil is in engagement with the inner circumferential surface of the claw-like magnetic pole portion, it is possible to prevent noise from being caused by magnetic force resonance of the claw-like magnetic pole portion. The claw-like magnetic pole portion is thinner than that in a prior-art structure, and the rigidity thereof is smaller than that in the prior-art structure. Accordingly, there is provided a great advantage. In the invention of claim 4, the field coil is surrounded by the resin impregnated sheet. Thus, sufficient electric insulation between the claw-like magnetic pole portion and the field coil is provided, and the space in the pole core can be maximally used and the alternator power output can be further increased. Since the resin impregnated sheet is used, the field coil can be fixed without using any adhesive.

According to the invention of claim 5, an alternator for a vehicle includes a field current adjustment device. The field current adjustment device has a transistor which is connected to a high voltage side of the field coil. Thus, the field coil is not subjected to a voltage when the vehicle remains inoperative. Accordingly, it is possible to prevent the occurrence of galvanic corrosion between the field coil and the pole core, especially between the field coil and the claw-like magnetic pole portion. Therefore, the minimal gap between the field coil and the pole core suffices, and an occupancy can be increased. Thus, the alternator power output can be further increased.

In the invention of claim 6, the multiple-layer iron core has slots, and the armature coil has a plurality of electric conductors. There is provided at least one pair of the electric conductors which are electrically insulated from each other with respect to depth directions of the slots, and which are separated into outer layers placed in deep regions of the slots and inner layers placed in opening sides of the slots. The electric conductors in the outer layers and the inner layers in different slots are connected in series.

In the invention of claim 6, the coil ends of the armature coil are aligned, and are prevented from overlapping each other in radial directions. Accordingly, the coil ends of the armature coil can be miniaturized, and the axial-direction entire length of the stator can be shorter. Thus, the axial length L1 of the stator iron core can be greater than the axial length L2 of the cylindrical portion of the pole core while the housing of the alternator remains unchanged. Therefore, the parameters of the alternator can be set in the previously-mentioned optimal ranges without limitation by the housing of the alternator. As a result, it is possible to provide a compact alternator structure and a high alternator power output. At the same time, the coil length can be shorter, and the axial length L1 of the stator iron core can be increased without increasing the resistance of the armature coil. Thereby, an increase in copper loss is avoided, and hence a high efficiency and a high cooling performance of the alternator are attained.

DESCRIPTION OF THE PREFERRED EMBODIMENT

Figure 1:
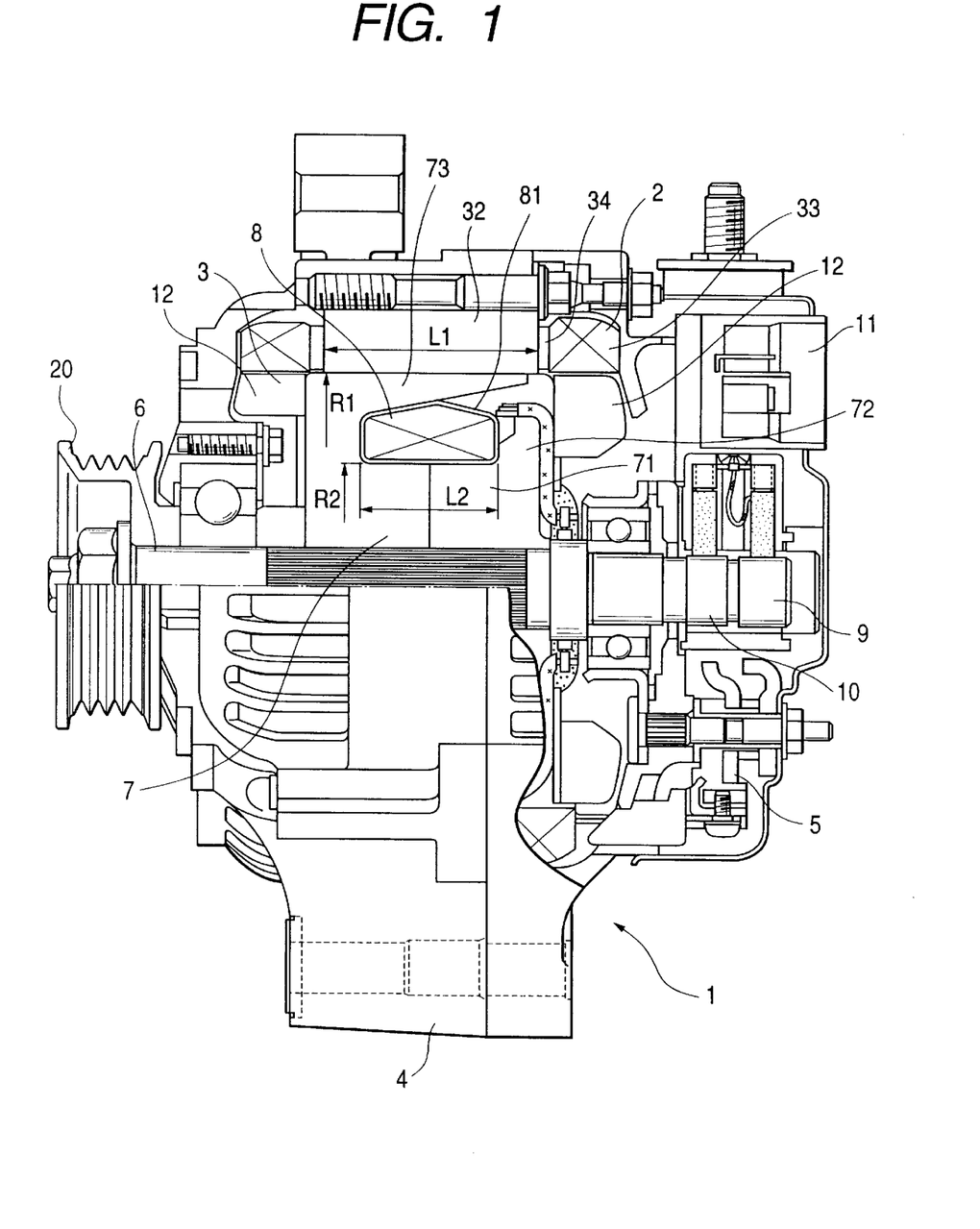
FIG. 1 is a sectional view of a main portion of an alternator for a vehicle according to an embodiment of this invention.

With reference to FIG. 1, an alternator 1 for a vehicle according to an embodiment of this invention includes a stator 2, a rotor 3, a housing 4, a rectifier 5, and a voltage adjustment device 11. The stator 2 serves as an armature. The rotor 3 serves to generate magnetic field. The housing 4 supports the stator 2 and the rotor 3. The rectifier 5 is directly connected to the stator 2. The rectifier 5 converts alternating current power into direct current power. The voltage adjustment device 11 adjusts a field current to control a generated electric power. Thus, the voltage adjustment device 11 serves as a field current adjustment device. A transistor in the voltage adjustment device 11 is connected to a high voltage side (a hot side) of a field coil so that the field coil can be prevented from being subjected to a voltage when the alternator 1 remains inoperative.

The rotor 3 rotates together with a shaft 6. The rotor 3 includes one set of Lundel-type pole cores 7, cooling fans 12, a field coil 8, and slip rings 9 and 10. The shaft 6 is connected to a pulley 20, and is rotated and driven by an engine (not shown) for powering the vehicle.

Figure 8:
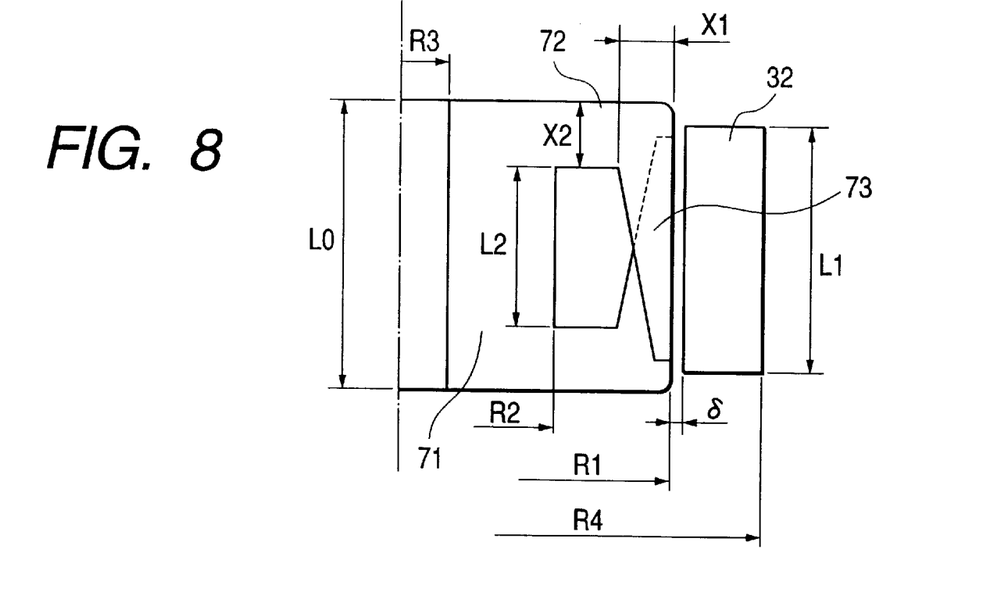
FIG. 8 is a sectional view of a pole core of a rotor contained in the alternator for the vehicle according to the embodiment of this invention.
Figure 9:
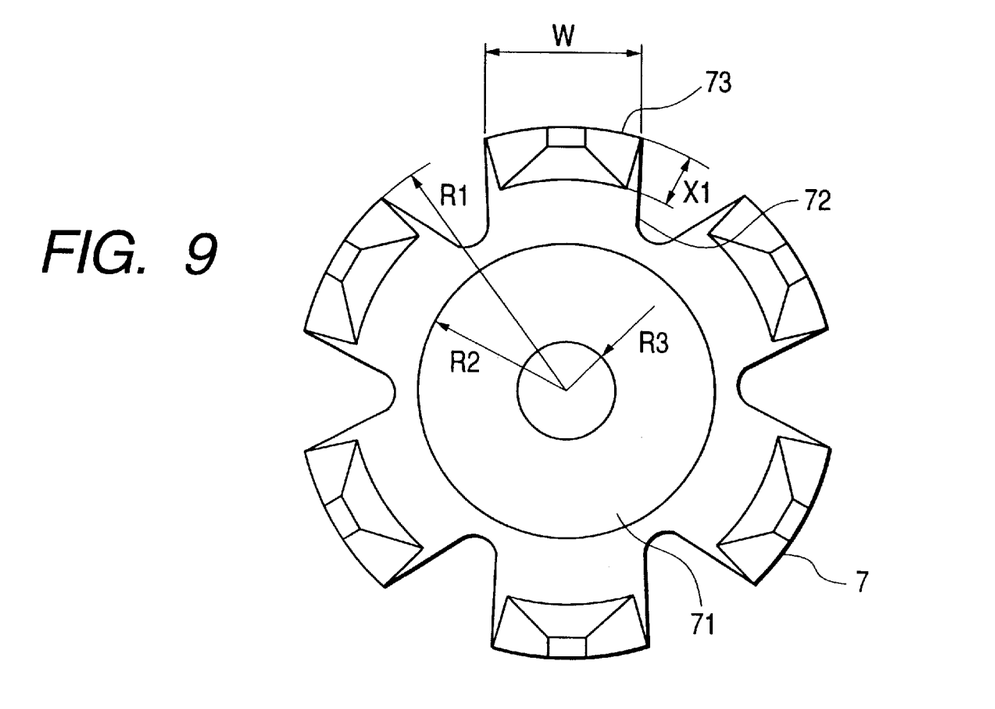
FIG. 9 is a plan view, in the direction from the cylindrical portion, of the rotor contained in the alternator for the vehicle according to the embodiment of this invention.

As shown in FIGS. 1, 8, and 9, each of the pole cores 7 of the rotor 3 has a cylindrical portion 71, a yoke portion 72, and a claw-like magnetic pole portion 73. The field coil 8 has a mountain-like shape such that a central portion of the field coil 8 as viewed in an axial direction is great in outside diameter, and that the outside diameter of a portion of the field coil 8 decreases as the portion is closer to an end. The contours of the field coil 8 correspond to shapes of the claw-like magnetic pole portions 73. The field coil 8 is in engagement with inner surfaces of the claw-like magnetic pole portions 73 via insulating paper 81 under a suitable compression force. The insulating paper 81 uses a resin impregnated sheet, and surrounds the field coil 8. The insulating paper 81 firmly holds the field coil 8 as a result of the exposure to a heating process. For example, a belt-like sheet is spirally wrapped around the field coil 8 to complete an enclosure. The field coil 8 may be sandwiched between petal-like sheets forming an enclosure.

The stator 2 has an iron core 32, an armature coil 33, and an insulator 34. The armature coil 33 is provided on the iron core 32. The insulator 34 provides electric insulation between the iron core 32 and the armature coil 33. As previously indicated, the stator 2 is supported by the housing 4. The iron core 32 has a laminate of thin steel plates. Thus, the iron core 32 is of the multiple-layer type.

The pole cores 7 correspond to a Lundel-type iron core. The iron core 32 of the stator 2 corresponds to a multiple-layer iron core.

A magnetic circuit will be explained in detail with reference to FIGS. 8 and 9. The axial length L2 of the cylindrical portions 71 of the pole cores 7 is set smaller than the axial length L1 of the stator iron core 32. The ratio of the axial length L1 to the axial length L2, that is, the value "L1/L2", is set in the range of 1.25 to 1.75. The axial-direction thickness of the yoke portions 72 is denoted by X2. The cross-sectional area of each of the yoke portions 72 is set substantially or approximately equal (in the range of ±10%) to the cross-sectional area of each of the cylindrical portions 71 which is divided by the number of magnetic pole pairs (six in the embodiment of this invention). The radial-direction thickness of bases of the claw-like magnetic pole portions 73 is denoted by X1. The ratio of the value X1 to the value X2, that is, the value "X1/X2", is set in the range of 0.5 to 0.9. The outside diameter of the cylindrical portions 71 is denoted by R2. The outside diameter of the claw-like magnetic pole portions 73 is denoted by R1. The ratio of the outside diameter R2 to the outside diameter R1, that is, the value "R2/R1", is set in the range of 0.54 to 0.60.

A reference cross-sectional area S1 is defined as follows.

$$S1=\{4\pi/(4P)\}(R2^2-R3^2)$$

where "P" denotes the number of magnetic pole pairs in the pole cores 7, and "R3" denotes the diameter of the shaft 6 (which is equal to 18% of the outside diameter of the claw-like magnetic pole portions 73).

The magnetic pole width W of the claw-like magnetic pole portions 73 is set as follows.

$$W=\pi R1/(2P)$$

The cross-sectional area S2 of the yoke portions 72 is set as follows.

$$S2 \approx S1 = W \cdot X2$$

The axial length L0 of the pole cores 7 is set equal to 55% of the outside diameter R1.

The coil diameter and other dimensions of the field coil 8 are chosen to satisfy the following conditions. A usable space defined by the inner surfaces of the cylindrical portions 71, the yoke portions 72, and the claw-like magnetic pole portions 73 is occupied by the field coil 8 at an occupancy of 68%. The field coil 8 has a resistance of 2.3 Ω.

The outside diameter R4 of the stator 2 is set equal to 129% of the outside diameter R1 of the claw-like magnetic pole portions 73 of the pole cores 7. The dimensions of the portions of the stator iron core 32 are chosen so that the cross-sectional area will have a ratio of 66% with respect to the reference cross-sectional area S1. A ratio of 66% is generally used as a result of a consideration of the leak of magnetic flux. The coil diameter of the armature coil 33 is chosen to provide an occupancy of 44% with respect to a slot area determined by the previously-mentioned dimensions.

An air gap δ in the alternator 1 (an air gap between the stator 2 and the rotor 3) is set to a generally used value, that is, 0.35 mm. The outside diameter Φ of the claw-like magnetic pole portions 73 is set to 92 mm. The thickness of distal ends of the claw-like magnetic pole portions 73 and other dimensions are chosen to correspond to a ratio similar to the ratio in a prior-art structure.

Figure 16:
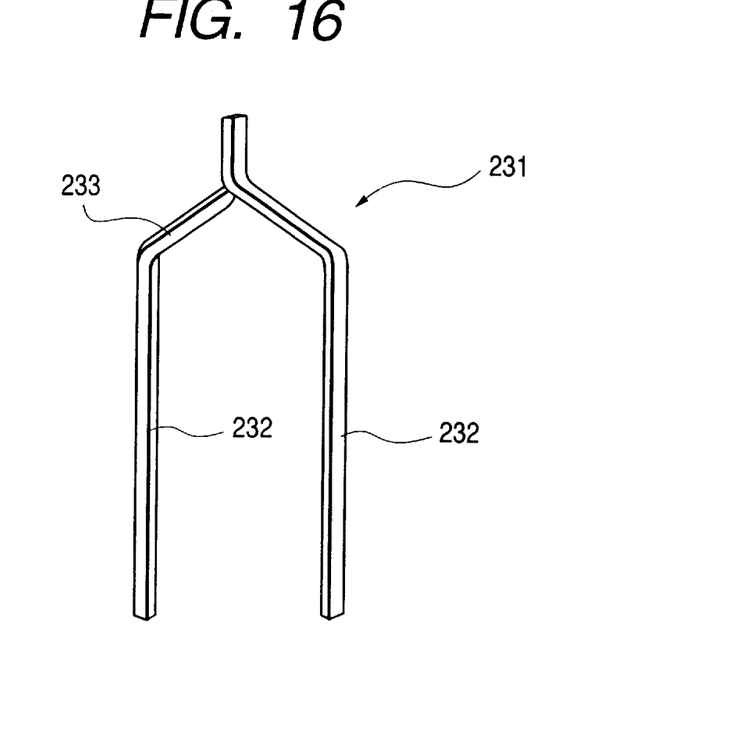
FIG. 16 is a perspective view of a U-shaped armature coil segment in the embodiment of this invention.
Figure 17:
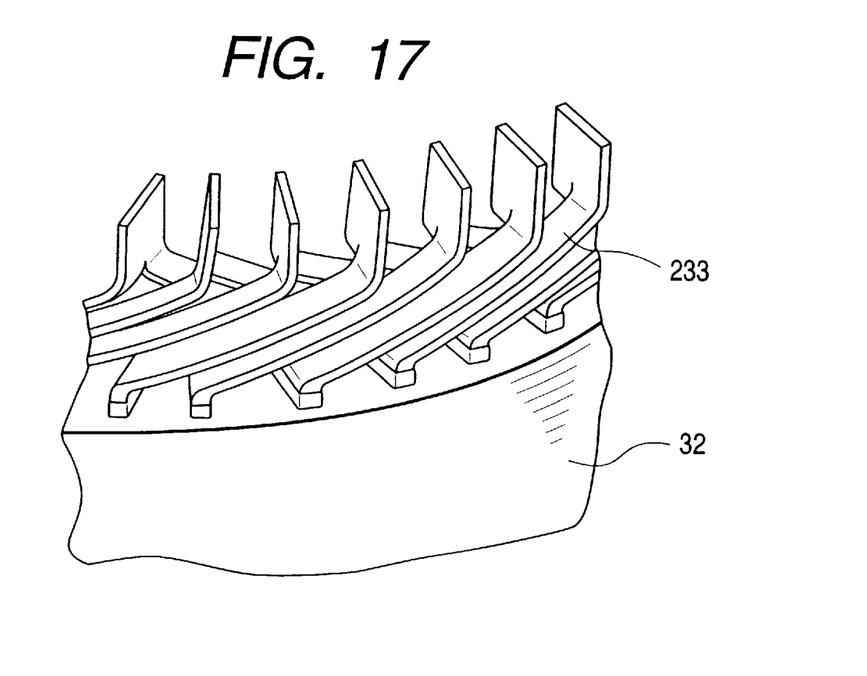
FIG. 17 is a perspective view of armature coil ends on the stator in the embodiment of this invention.

The armature coil 33 is formed by U-shaped electric conductors 231 each having two straight portions 232, and a turn portion 233 connecting ends of the straight portions 232 as shown in FIG. 16. With reference to FIG. 17, the U-shaped electric conductors 231 are inserted into slots in the stator iron core 32 in a manner such that ones of the straight portions 232 of the U-shaped electric conductors 231 are placed in inner radial regions of the slots (that is, opening sides of the slots in the radial directions) to form inner layers while the others are placed in outer radial regions of the slots (that is, deep regions of the slots) to form outer layers. In addition, the turn portions 233 of the U-shaped electric conductors 231 which connect the ends of the straight portions 232 thereof form coil ends extending out of the slots. During the formation of the armature coil 33 on the stator iron core 32, the U-shaped electric conductors 231 are made in a stack, being inserted into the slots via ends of the slots in one side so that the coil ends will be aligned. The inner-layer and outer-layer straight line portions 232 of the U-shaped electric conductors 231 which project from ends of the slots in the other side are bent toward circumferential directions of the stator iron core 32. Then, each of the straight line portions 232 extending out of the slots is connected to another of the straight line portions 232 which is separate from the former straight line portion 232 by one pole, and which is in a layer different from the layer of the former straight line portion 232. The electric conductors 231 in the outer layers and the inner layers in different slots are connected in series to complete the armature coil 33.

An explanation will be given of the advantages provided by the embodiment of this invention. As previously indicated, the ratio of the axial length L1 of the stator iron core 32 to the axial length L2 of the cylindrical portions 71 of the pole cores 7, that is, the value "L1/L2", is set in the range of 1.25 to 1.75. Therefore, the yoke portions 72 of the pole cores 7 can be made to oppose the stator iron core 32, and magnetic flux can directly flow from the yoke portions 72 into the stator iron core 32. Thus, the magnetic flux which comes from the claw-like magnetic pole portions 73 can be reduced, and the cross-sectional area of the claw-like magnetic pole portions 73 can be reduced in proportion thereto. Accordingly, the usable space in the pole cores 7 is provided with a surplus so that the ratio of the outside diameter R2 of the cylindrical portions 71 to the outside diameter R1 of the claw-like magnetic pole portions 73, that is, the value "R2/R1", can be properly set with a magnetic-path cross-sectional area being greater than that in a prior-art structure while a suitable coil cross-sectional area is provided. The value "R2/R1" is set in a preferable range, that is, the range of 0.54 to 0.60. Thereby, the alternator power output can be improved over that available in a prior-art structure.

As previously indicated, the ratio of the radial-direction thickness X1 of the bases of the claw-like magnetic pole portions 73 to the axial-direction thickness X2 of the yoke portions 72, that is, the value "X1/X2", is set in the range of 0.5 to 0.9. Thus, the magnetic flux density in the claw-like magnetic pole portions 73 can be set to a suitable value without any overs and shorts. Accordingly, it is possible to prevent the claw-like magnetic pole portions 73 from being so thick as to deteriorate the coil cross-sectional area. Also, it is possible to prevent the claw-like magnetic pole portions 73 from being so thin as to reduce the alternator power output.

Figure 10:
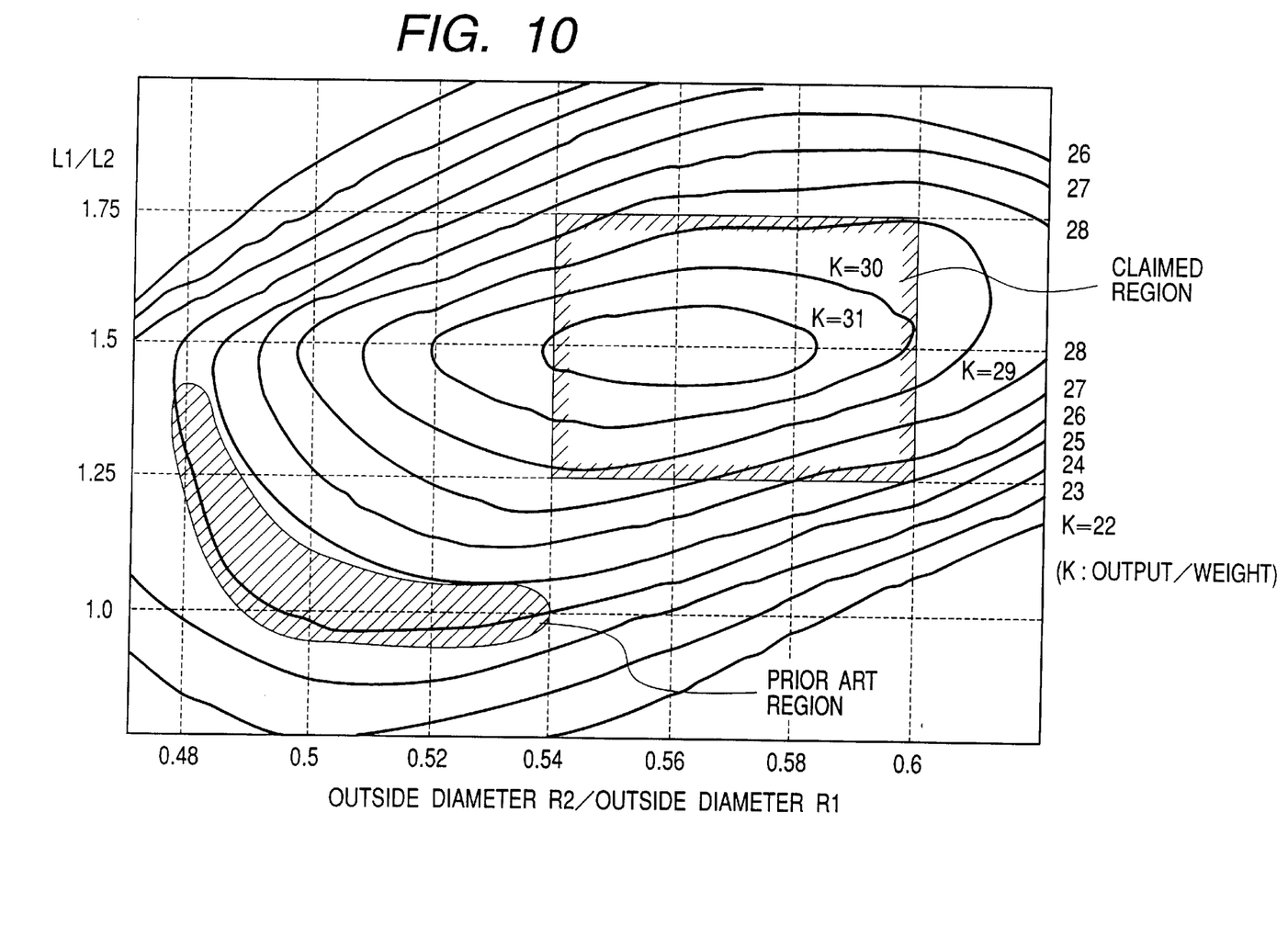
FIG. 10 is a diagram of the relation among an alternator power output per unit weight, a ratio "L1/L2", and a ratio "R2/R1".

The advantages of the embodiment of this invention were confirmed by experiments. FIG. 10 shows the results of experiments during which the alternator power output per unit weight was measured while the ratios "L1/L2" and "R2/R1" were varied as parameters. As previously indicated, the value "L1/L2" is equal to the ratio of the axial length L1 of the stator iron core 32 to the axial length L2 of the cylindrical portions 71 of the pole cores 7. The value "R2/R1" is equal to the ratio of the outside diameter R2 of the cylindrical portions 71 to the outside diameter R1 of the claw-like magnetic pole portions 73.

In FIG. 10, the ordinate denotes the value "L1/L2", that is, the ratio of the axial length L1 of the stator iron core 32 to the axial length L2 of the cylindrical portions 71 of the pole cores 7 while the abscissa denotes the value "R2/R1", that is, the ratio of the outside diameter R2 of the cylindrical portions 71 to the outside diameter R1 of the claw-like magnetic pole portions 73. In FIG. 10, the alternator power output per unit weight is denoted by the contour lines. During the experiments, the maximum alternator power output was measured when the alternator was operated at a rotational speed of 2,000 rpm and an alternator voltage of 13.5V, and under the presence of thermal saturation. The alternator power output per unit weight in FIG. 10 was equal to the maximum alternator power output divided by the sum of the weights of the rotor and the stator.

Figure 11:
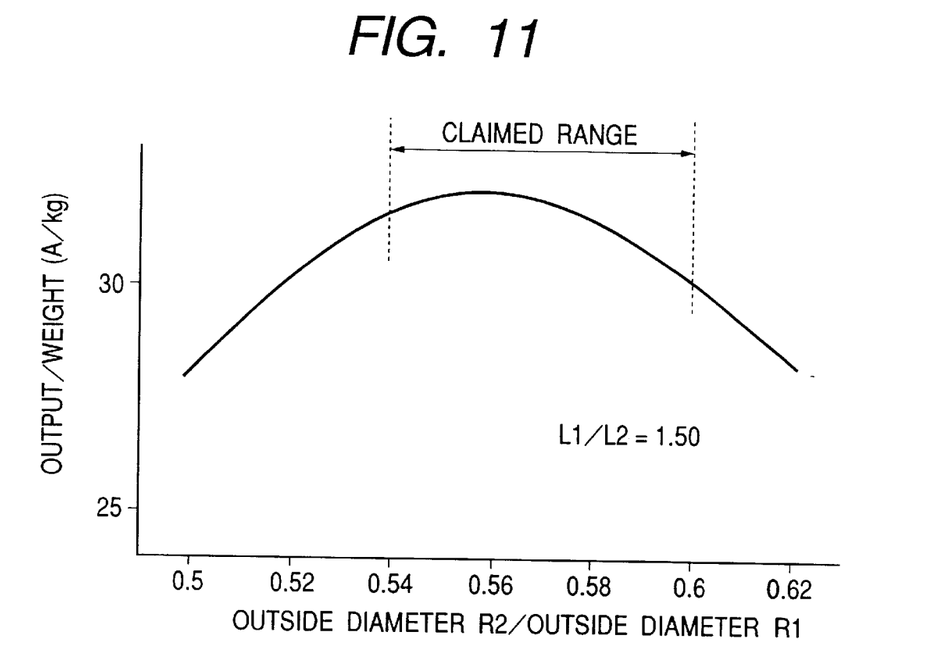
FIG. 11 is a diagram of the relation between an alternator power output per unit weight and a ratio "R2/R1".

FIG. 11 shows conditions of a region near the maximal point in FIG. 10. Specifically, FIG. 11 indicates the alternator power output per unit weight which was available in the case where the ratio "R2/R1" was varied while the ratio "L1/L2" was fixed to 1.50.

Figure 12:
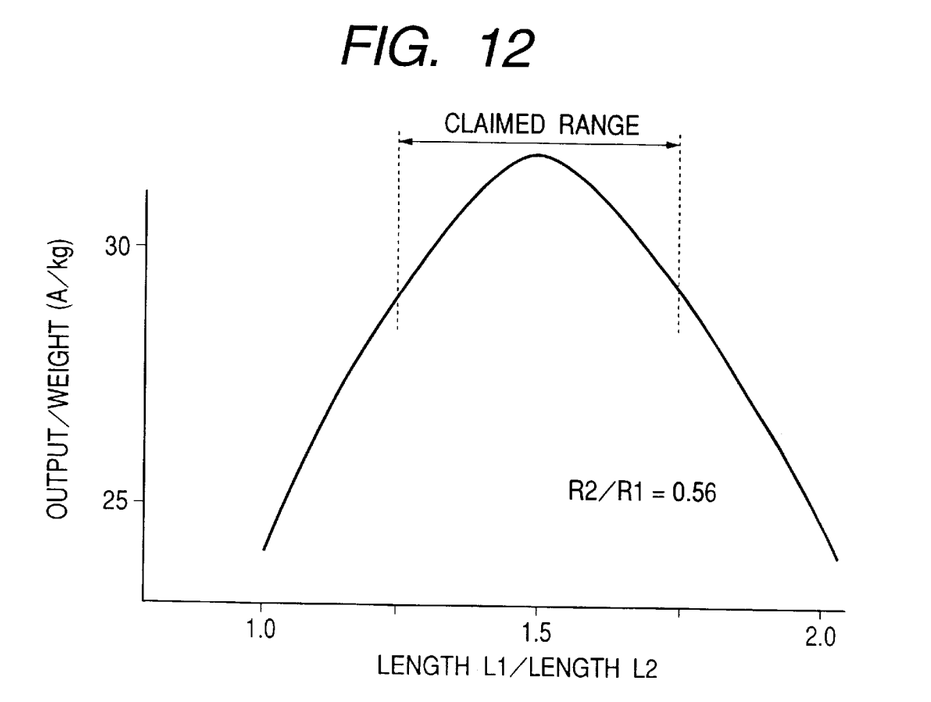
FIG. 12 is a diagram of the relation between an alternator power output per unit weight and a ratio "L1/L2".

FIG. 12 shows conditions of a region near the maximal point in FIG. 10. Specifically, FIG. 12 indicates the alternator power output per unit weight which was available in the case where the ratio "L1/L2" was varied while the ratio "R2/R1" was fixed to 0.56.

In FIG. 10, a prior-art region extends near the line on which the ratio "L1/L2" is equal to "1". As shown in FIG. 10, the alternator power output per unit weight rises in a region where both the ratios "L1/L2" and "R2/R1" are increased from those available in the prior-art region. Specifically, the alternator power output per unit weight is maximized when the ratio "L1/L2" is equal to about 1.5 while the ratio "R2/R1" is equal to about 0.56. The optimal range of the ratio "R2/R1" shifts in accordance with a change of the ratio "L1/L2" with respect to the prior-art region. In the case where the magnetic-path cross-sectional area is greater than that available in a prior-art structure, or in the case where the outside diameter R2 of the cylindrical portions 71 is relatively great, the optimal point is available and the maximum alternator power output is further increased. On the other hand, the weight of the stator 2 excessively increases when the increase in the ratio "L1/L2" exceeds a certain value. It is found that the alternator power output per unit weight is improved over that in a prior-art structure when the ratio "L1/L2" is in the range of 1.25 to 1.75 and the ratio "R2/R1" is in the range of 0.54 to 0.60.

It is shown in FIG. 10 that only a change in the ratio "L1/L2" or only a change in the ratio "R2/R1" hardly provides an effect, and that such a change tends to decrease the alternator power output. In the embodiment of this invention, both the ratios "L1/L2" and "R2/R1" are suitably adjusted, and thereby a synergistic effect is provided which causes good alternator output characteristics unavailable in a prior-art structure.

Figure 13:
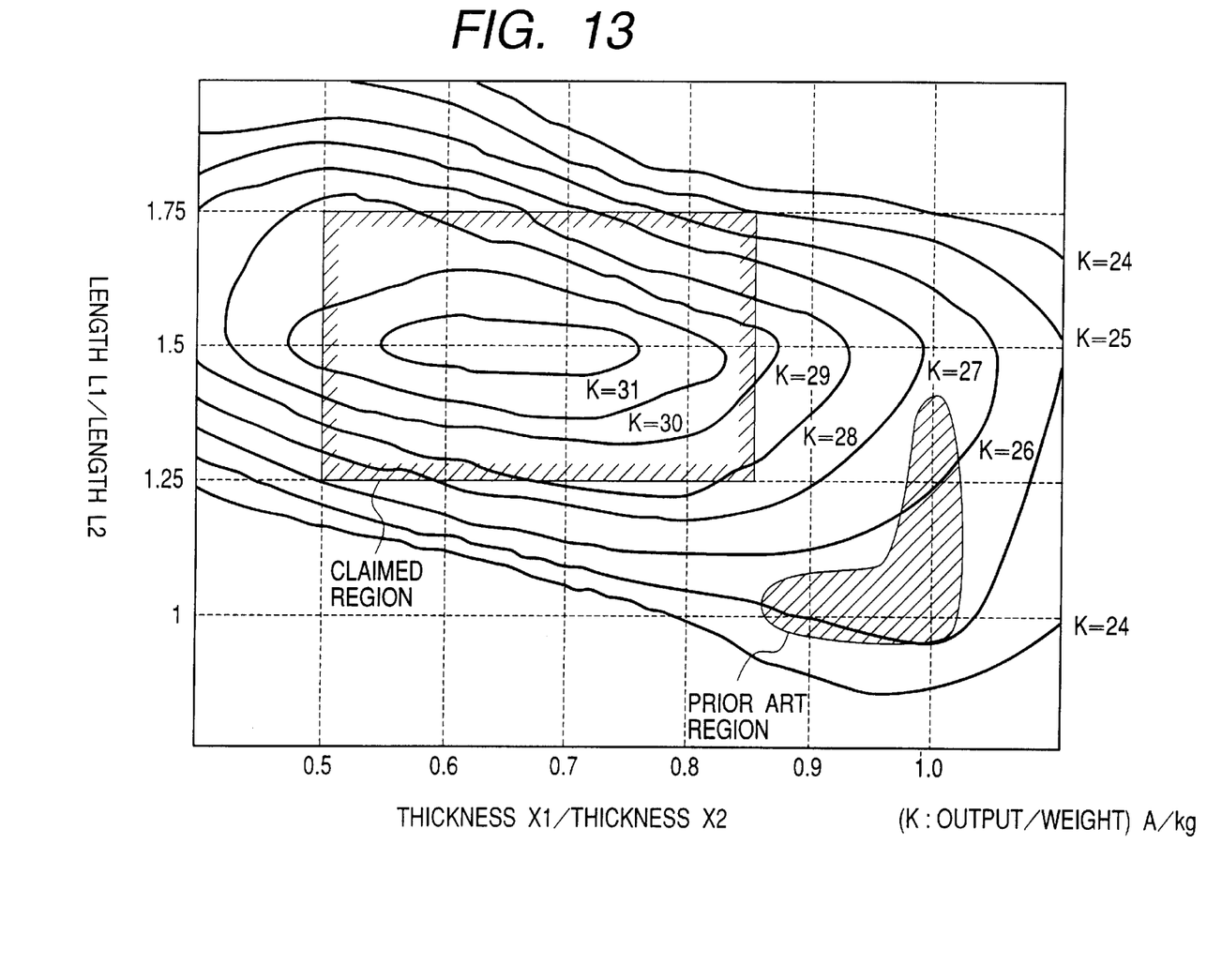
FIG. 13 is a diagram of the relation among an alternator power output per unit weight, a ratio "L1/L2", and a ratio "X1/X2".

FIG. 13 shows plotted values of the alternator power output per unit weight which occurred in the case where the ratio "L1/L2" was used as a parameter, and the outside diameter R1 of the claw-like magnetic pole portions 73 was equal to 92 mm and the outside diameter R2 of the cylindrical portions 71 was set to the optimal value by referring to FIG. 10, and the radial-direction thickness X1 of the bases of the claw-like magnetic pole portions 73 was varied. In FIG. 13, the ordinate denotes the value "L1/L2", that is, the ratio of the axial length L1 of the stator iron core 32 to the axial length L2 of the cylindrical portions 71 of the pole cores 7 while the abscissa denotes the value "X1/X2", that is, the ratio of the radial-direction thickness X1 of the bases of the claw-like magnetic pole portions 73 to the axial-direction thickness X2 of the yoke portions 72. In FIG. 13, the alternator power output per unit weight is denoted by the contour lines.

Figure 14:
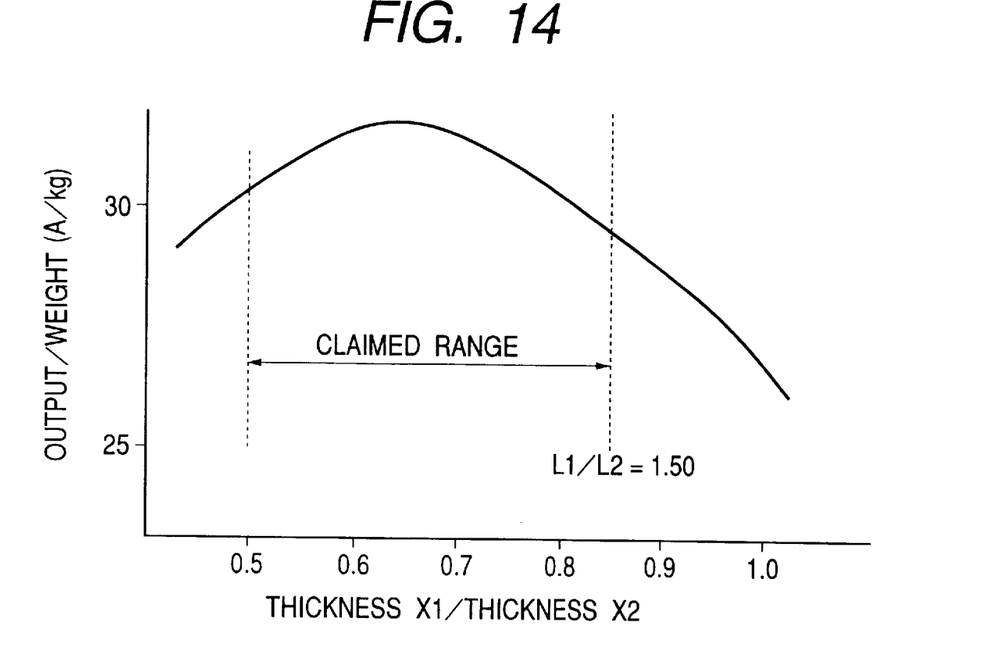
FIG. 14 is a diagram of the relation between an alternator power output per unit weight and a ratio "X1/X2".

FIG. 14 shows conditions of a region near the maximal point in FIG. 13. Specifically, FIG. 14 indicates the alternator power output per unit weight which was available in the case where the ratio "X1/X2" was varied while the ratio "L1/L2" was fixed to 1.50.

Figure 15:
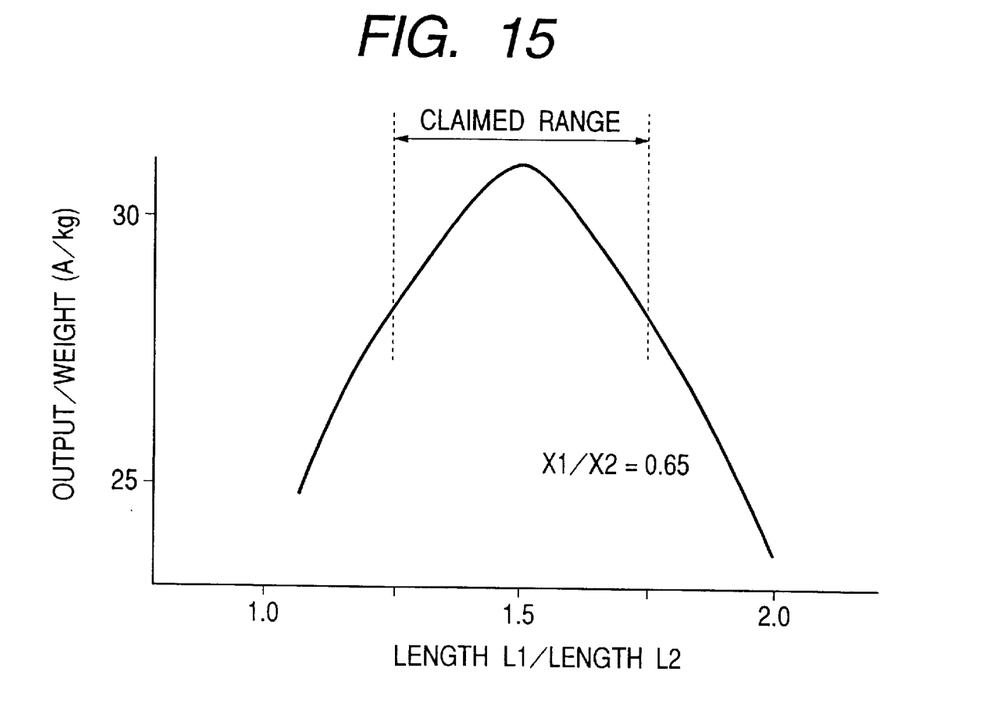
FIG. 15 is a diagram of the relation between an alternator power output per unit weight and a ratio "L1/L2".

FIG. 15 shows conditions of a region near the maximal point in FIG. 13. Specifically, FIG. 15 indicates the alternator power output per unit weight which was available in the case where the ratio "L1/L2" was varied while the ratio "X1/X2" was fixed to 0.65.

It is understood from FIG. 13 that the optimal range of the ratio "X1/X2" shifts in accordance with a change of the ratio "L1/L2". In the case where the cross-sectional area of the bases of the claw-like magnetic pole portions 73 or the radial-direction thickness X1 of the bases of the claw-like magnetic pole portions 73 is smaller than that in a prior-art structure, the optimal point is available and the maximum alternator power output is further increased. On the other hand, the weight of the stator 2 excessively increases when the increase in the ratio "L1/L2" exceeds a certain value. It is found that the alternator power output per unit weight is improved over that in a prior-art structure when the ratio "L1/L2" is in the range of 1.25 to 1.75 and the ratio "X1/X2" is in the range of 0.5 to 0.85. Under these settings, the magnetic flux density in the claw-like magnetic pole portions 73 can be set to a suitable value without any overs and shorts. Accordingly, it is possible to prevent the claw-like magnetic pole portions 73 from being so thick as to deteriorate the coil cross-sectional area. Also, it is possible to prevent the claw-like magnetic pole portions 73 from being so thin as to reduce the alternator power output.

It is shown in FIG. 13 that only a change in the ratio "L1/L2" or only a change in the ratio "X1/X2" hardly provides an effect, and that such a change tends to decrease the alternator power output. In the embodiment of this invention, both the ratios "L1/L2" and "X1/X2" are suitably adjusted, and thereby a synergistic effect is provided which causes good alternator output characteristics unavailable in a prior-art structure.

In the embodiment of this invention, the parameters are set in the optimal ranges as previously explained. Therefore, it is possible to provide a suitable core cross-sectional area and a suitable coil cross-sectional area, which can not be set in a prior art structure, without enlarging the rotor 3. In addition, it is possible to attain a compact structure and a high power output of the alternator 1. Since the amount of heat generated by the field coil 8 is comparable to that in a prior-art structure, it is possible to prevent the occurrence of the problem that the field coil 8 is overheated.

The coil ends on the stator 2 serve as cooling fins. In the embodiment of this invention, since the area via which the coil ends on the stator 2 oppose the cooling fans 12 is relatively wide, the armature coil 33 can be effectively cooled.

In the embodiment of this invention, since the field coil 8 has a mountain-like shape, the area occupied by the field coil 8 increases so that a higher alternator power output is available. Since the field coil 8 is in engagement with the inner circumferential surfaces of the claw-like magnetic pole portions 73 under a suitable compression force, it is possible to prevent noise from being caused by magnetic force resonance of the claw-like magnetic pole portions 73. Thus, the thickness of the bases of the claw-like magnetic pole portions 73 can be made small without paying attention to the rigidity thereof, and the maximum alternator power output is attained without limitation by noise.

In the embodiment of this invention, the field coil 8 is surrounded by the insulating paper 81 which uses the resin impregnated sheet. Thus, sufficient electric insulation between the claw-like magnetic pole portions 73 and the field coil 8 is provided, and the space in the pole cores 7 can be maximally used and the alternator power output can be further increased. It is unnecessary to use adhesive for fixing the field coil 8. This is advantageous for a simplified alternator structure.

In the embodiment of this invention, the transistor in the voltage adjustment device 11 is connected to the high voltage side of the field coil 8. Thus, the field coil 8 is not subjected to a voltage when the vehicle remains inoperative. Accordingly, it is possible to prevent the occurrence of galvanic corrosion between the field coil 8 and the pole cores 7. The field coil 8 which has a mountain-like shape does not deteriorate the environmental characteristics, and the related occupancy is improved.

As shown in FIG. 17, the armature coil 33 is formed by a regular arrangement of the U-shaped electric conductors 231. The armature coil 33 has a pattern such that the electric conductors 231 which form the coil ends are spaced at regular intervals in the circumferential direction of the stator iron core 32.

In a prior-art structure, coil ends of an armature coil on a stator which have different phases partially overlap each other in radial directions, and the radial-direction thickness of the coil ends needs to be small to dispose the stator with the armature coil in an alternator housing. Accordingly, in the prior-art structure, it is usual that the axial-direction height of the coil ends is set great and hence the coil ends are made into a flat shape, and the radial-direction thickness thereof is set small. Thus, in the prior-art structure, it is necessary that the height of the coil ends is equal to or greater than a certain value. As a result, in the prior-art structure, the axial-direction length of the stator is increased as the axial length of the stator iron core is increased, and it is difficult to locate the stator without changing an axial-direction space in the alternator housing.

On the other hand, in the embodiment of this invention, as shown in FIG. 17, the coil ends are equal in axial-direction thickness, and the height of the coil ends can be smaller than that in a prior-art structure. Accordingly, the axial length L1 of the stator iron core 32 can be greater than that in a prior-art structure while the housing 4 of the alternator 1 remains unchanged. Therefore, the parameters of the alternator 1 can be set in the previously-mentioned optimal ranges without limitation by the housing 4 of the alternator 1. As a result, it is possible to provide a compact alternator structure and a high alternator power output. At the same time, the coil length can be shorter, and the axial length L1 of the stator iron core can be increased without increasing the resistance of the armature coil. Thereby, an increase in copper loss is avoided, and hence a high efficiency and a high cooling performance of the alternator 1 are attained.

In the embodiment of this invention, the ratio of the axial length L1 of the stator iron core 32 to the axial length L2 of the cylindrical portions 71 of the pole cores 7, that is, the value "L1/L2", is set in the range of 1.25 to 1.75. In addition, the ratio of the outside diameter R2 of the cylindrical portions 71 to the outside diameter R1 of the claw-like magnetic pole portions 73, that is, the value "R2/R1", is set in the range of 0.54 to 0.60. Furthermore, the ratio of the thickness X1 of the bases of the claw-like magnetic pole portions 73 to the thickness X2 of the yoke portions 72, that is, the value "X1/X2", is set in the range of 0.5 to 0.9. As shown in FIGS. 10 and 13, in order to provide a stable and high alternator power output per unit weight, it is preferable to set the ratio "L1/L2" in the range of 1.45 to 1.55, the ratio "R2/R1" in the range of 0.54 to 0.58, and the ratio "X1/X2" in the range of 0.6 to 0.87.

In the embodiment of this invention, the field coil 8 has a resistance of 2.3 Ω. Even in the case where the resistance of the field coil 8 differs from 2.3 Ω, the principle is the same and similar results are available while only the coil "AT" changes (that is, only the size of the filed coil 8 changes).

A general range of the resistance of a field coil is decided by limitation on the cooling ability of an air cooled alternator for a vehicle. The general range extends between 1.2 Ω and 3.6 Ω for an alternator designed to operate at a voltage of 12 V. The general range extends between 4.8 Ω and 14.4 Ω for an alternator designed to operate at a voltage of 24 V.

The parameter setting ranges in the embodiment of this invention are effective when the resistance of the field coil 8 is in the above-mentioned general range.

In the embodiment of this invention, the outside diameter R1 of the claw-like magnetic pole portions 73 is equal to 92 mm. Similar advantageous results are available even when the size of the claw-like magnetic pole portions 73 is changed. The parameter setting ranges in the embodiment of this invention are effective when the outside diameter R1 of the claw-like magnetic pole portions 73 is set in the range of 70 mm to 110 mm.

In the embodiment of this invention, the number of poles in the rotor 3 is twelve. Similar advantages are available even when the number of poles in the rotor 3 is equal to another value, for example, fourteen or sixteen.

What is claimed is:

1. An alternator for a vehicle, comprising:

a field rotor including a Lundel-type iron core and a field coil provided on the Lundel-type iron core, the Lundel-type iron core having a cylindrical portion, a yoke portion, and a claw-like magnetic pole portion, the field coil being provided on the cylindrical portion, the yoke portion extending from the cylindrical portion in a radially outward direction, the claw-like magnetic pole portion being connected to the yoke portion and being formed so as to surround the field coil; and a stator located radially outward of the claw-like magnetic pole portion and opposing the claw-like magnetic pole portion, the stator including a multiple-layer iron core and an armature coil provided on the multiple-layer iron core;

wherein a ratio of an axial-direction length L1 of the multiple-layer iron core of the stator to an axial-direction length L2 of the cylindrical portion of the Lundel-type iron core is in a range of 1.25 to 1.75, and a ratio of an outside diameter R2 of the cylindrical portion of the Lundel-type iron core to an outside diameter R1 of the claw-like magnetic pole portion of the Lundel-type iron core is in a range of 0.54 to 0.60.

2. An alternator according to claim 1, wherein a ratio of a radial-direction thickness X1 of a base of the claw-like magnetic pole portion to an axial-direction thickness X2 of the yoke portion is in a range of 0.5 to 0.9.

3. An alternator according to claim 1 or 2, wherein an axial-direction cross section of the field coil is substantially symmetrical with respect to an axial-direction center, and has a mountain-like shape such that an outside diameter of a part of the field coil is greater as the part of the field coil is closer to the axial-direction center.

4. An alternator according to claim 3, further comprising a resin impregnated sheet surrounding the field coil, the field coil being in engagement with an inner circumferential surface of the claw-like magnetic pole portion via the resin impregnated sheet.

5. An alternator according to one of claims 1 to 4, further comprising a field current adjustment device including a transistor which is connected to a high voltage side of the field coil.

6. An alternator according to one of claims 1 to 5, wherein the multiple-layer iron core has slots, and the armature coil has a plurality of electric conductors, wherein there is provided at least one pair of the electric conductors which are electrically insulated from each other with respect to depth directions of the slots, and which are separated into outer layers placed in deep regions of the slots and inner layers placed in opening sides of the slots, and wherein the electric conductors in the outer layers and the inner layers in different slots are connected in series.

\* \* \* \* \*